Feb. 4, 1969    F. PERRUCA    3,425,528
FRICTIONAL SLIP COUPLING WITH THERMOSTATIC ALARM
Filed Dec. 22, 1966
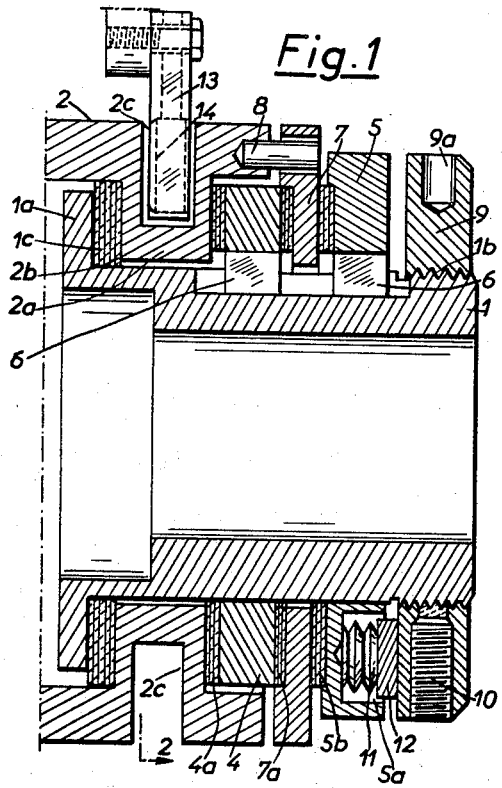
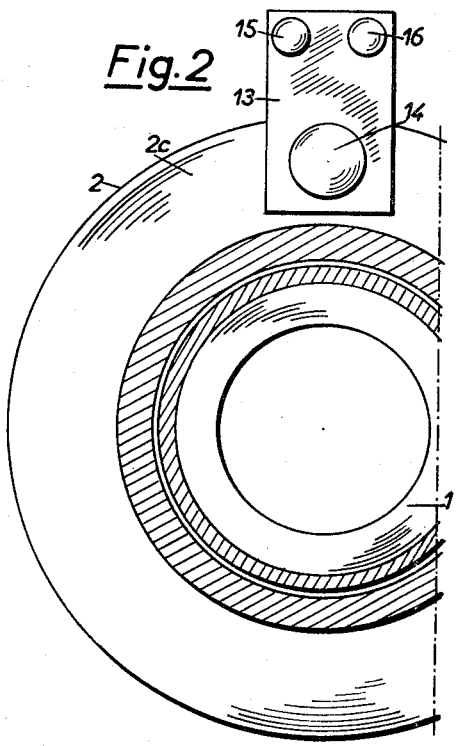
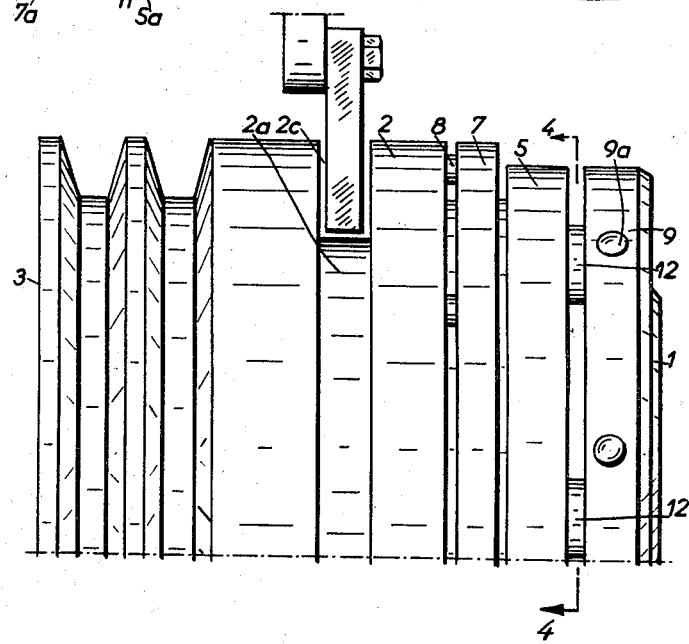

United States Patent Office 3,425,528
Patented Feb. 4, 1969

3,425,528
FRICTIONAL SLIP COUPLING WITH
THERMOSTATIC ALARM
Felix Perruca, 10 Place Locarno, Saint-Etienne, France
Filed Dec. 22, 1966, Ser. No. 603,805
Claims priority, application France, Jan. 7, 1966,
9,355
U.S. Cl. 192—70.27                3 Claims
Int. Cl. F16d 13/50, 3/50, 7/02

ABSTRACT OF THE DISCLOSURE

Torque-limiting arrangement in which coaxial driven and driving members are coupled axially by ring and friction members controlled by an axially applied force, the arrangement having a thermostatically controlled alarm.

---

The present invention has as an object the provision of a torque-limiting or stress-limiting arrangement operating under the action of the pressure exerted between adjacent members subjected to a suitably gauged elastic pressure. The invention relates also applications incorporating such a torque-limiting arrangement.

Frictional torque-limiting arrangements are known which are generally of the type including two alternating series of discs revolving in unison with the driving member and with the driven or receiving member, while elastic means exert on the disc system a compression of a predetermined value. Such arrangements have a number of drawbacks such as difficulty in uniform adjustment and annular distribution of pressure between the discs, possible deformation of the discs due to heat produced by friction, the absence of automatic control of the operation of the arrangement, excessive diametrical bulk, and so forth.

The improved frictional torque-limiting arrangement according to the present invention has been designed to eliminate these drawbacks as will appear in the following description.

A frictional torque-limiting arrangement of the invention is characterized chiefly by the fact that it includes a central body and a coaxial outer sleeve, said body and sleeve being employed such that one of said parts may be operatively connected with a driving member and the other with the driven member.

The body which is provided with a shoulder is designed so as to carry large-sized rings rotating in unison with said body, while they are free to move axially. The sleeve which is provided with an inner flange forming a bearing surface similarly carries one or more rings inserted between the rings carried by the body. A friction lining is fitted or formed directly on the corresponding annular surfaces of the shoulder of the body and of the rings carried by the body, separate elastic compressing means being furthermore mounted to act on the last-assembled ring and a simultaneous uniform adjustment of said elastic means being provided by a thrust-exerting nut on a threaded section of the body of the arrangement.

According to a further feature of the invention, a deep transverse groove is formed in the sleeve and its inner flange in axial registery with the linings, a stationary plate or support being inserted in said groove and carrying a thermostat adjusted to close an electric circuit whenever a predetermined temperature due to friction is reached in said groove particularly when the driving and driven members assume a certain angular displacement under the action of an overload.

Said features and advantages will be noted in the following description, reference being made to the accompanying drawings illustrating a preferred embodiment of the invention without however limiting its scope. In said drawings:

FIG. 1 is a general axial cross-sectional view of one embodiment given by way of example of a frictional torque-limiting arrangement according to the invention;

FIG. 2 is a transverse cross-sectional view of a part of the arrangement along section line 2—2 in said FIG. 1;

FIG. 3 is an outer general view of the frictional torque-limiting arrangement associated for instance with a grooved pulley;

Figure 4:
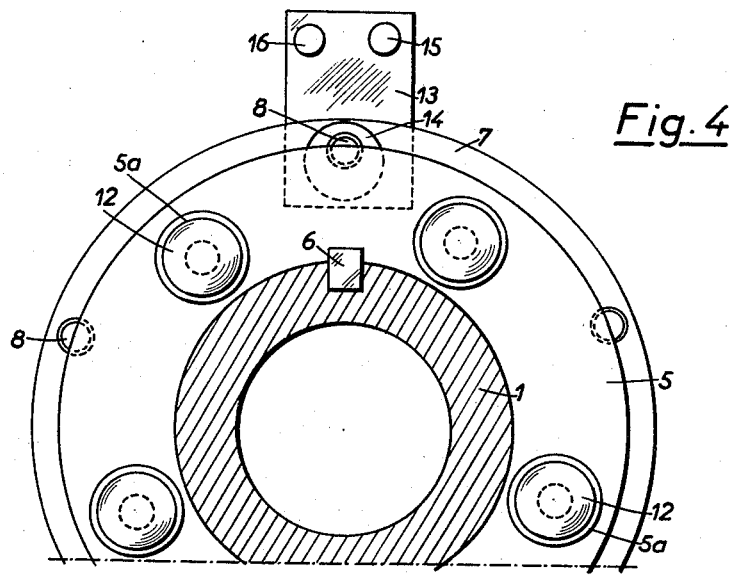
FIG. 4 is a transverse cross-sectional view as seen along line 4—4 of FIG. 3.

The different embodiments will now be described in a more detailed manner.

As shown in FIGS. 1 to 4, the first embodiment of the invention is a torque-limiting arrangement which includes a body 1 which may be fitted and secured for instance to the end of a shaft, say a driving shaft or a driven shaft. The means for assembling said body 1 with said shaft may be of any known type and need not be described or illustrated.

A sleeve 2 is located coaxially with reference to the body 1 and its end is designed in any suitable manner as to be operatively connected directly or otherwise with a shaft or like driving or driven member. In the example illustrated and in a non-limiting sense, the sleeve 2 is assumed to be rigid with a grooved pulley 3 (FIG. 3). At one end of the body 1, the latter is provided with an outer shoulder 1a engaging the bearing surface formed on an inner flange of said sleeve. Beyond said bearing surface and on the side thereof opposed to the shoulder 1a are fitted successive rings which revolve in alternation in unison with the body 1 and with the sleeve 2. The number of said rings and also the size and bulk of the whole arrangement may vary according to the conditions of application of the said arrangement.

In the example illustrated, two rings 4 and 5 are shown which revolve in unison with the body 1 as provided by corresponding keys 6, said rings being however adapted to move freely in an axial direction. Between the rings 4 and 5 is inserted a ring 7 revolving in unison with the sleeve 2 as provided by guiding projections 8 rigid with the sleeve extending in parallel with the axis of the latter and over which is slidingly fitted said ring 7 in which are formed openings of a corresponding shape.

Beyond the ring 5, there is provided at the end of the body 1, a threaded section 1b over which is screwed a nut 9 provided peripherally with radial openings 9a or the like for driving means and engaged radially by a grub screw 10 having a hollow six-sided recess or a square driving extension. The screw 10 exerts a locking pressure on the threaded section 1b directly or through the agency of a staying shim. It is thus possible to accurately define the position of the nut 9.

Stacks of elastic washers 11 are housed within corresponding openings 5a formed in the ring 5 in parallel with the axis of the arrangement and distributed in a preferably uniform annular succession round said axis. Said elastic washers, which are of any well-known type, are fitted between said ring and the nut and insure a maximum pressure on the ring for minimum volume conditions. It is however possible if required to resort to other elastic means. Intermediate staying shims 12 are inserted between the nut 9 and said washers 11.

It will be readily understood that such an arrangement allows executing an accurate simultaneous and uniform adjustment of the different elastic means exerting a pressure in an axial direction on the rings and consequently on the bearing surface on the flange 2a, while a counter pressure is exerted in the opposite direction starting from the shoulder 1a towards said flange 2a. The annular surfaces of the different parts engaging each other such as the shoulder 1a, the rings 4 and 5 carry friction linings shown respectively at 1c, 7a, 4a and 5b. Said friction linings may be made of any suitable material of a type well-known for this purpose and having the desired coefficient of friction. The friction linings may be inserted between the contacting surfaces or else it is possible to deposit the material directly on one of said surfaces.

In a preferred embodiment of the invention, it is possible to directly apply over the contacting surfaces a sintered material having a very good frictional coefficient.

The improved torque-limiting arrangement illustrated also has an interesting feature consisting of a permanent and automatic control of the operation of the arrangement with a view toward detecting the heat produced by a relative angular shifting between the parts subjected to compression in the event of an overload.

To this end, there is provided a radial groove 2c in the sleeve 2 preferably within the inner flange 2a and said groove is sufficiently deep for it to extend into axial registry with the friction linings.

Figure 8:
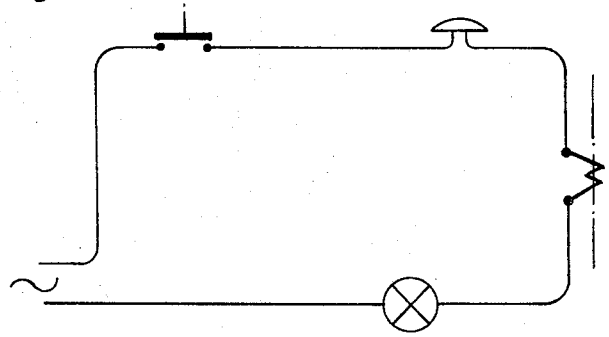
FIG. 8 is an alarm signal wiring diagram.

There is inserted inside said groove 2a the end of a plate 13 held fast therein in any manner suiting the case described. Said plate is provided with thermostatic means 14 of a well-known type operating upon increase in the ambient temperature which increase produces an expansion and closes, by means of a switch, an electric circuit the wires of which are fed by the connecting terminals 15 and 16. Said circuit is adapted to operate any optical or acoustic alarm system (e.g., see FIG. 8) and/or the stopping of the supply of power to a motor and of the operation of the whole plant.

The interest and advantages of the above-described torque limiting arrangement appear clearly from the following description, and inspection of the corresponding drawings and it should merely be stressed that:

The accuracy and stability of the arrangement are such that its transmitting and driving capacity for which it has been adjusted remains unaltered beyond which capacity friction arises and consequently there is an automatic disconnection in the transmission whenever the resistant or driving torque assumes an exaggerated value under dangerous conditions of lack of equilibrium for the transmission and machines and parts involved. Said accuracy and stability are ascribable in particular to the design of the arrangement, all the parts of which are rigid and sturdy, this being in particular the case for the rings the thicknesses of which are large and which do not show the deformations of the washers used in conventional arrangements. The use of sintered material for insuring friction cooperates in insuring the desired accuracy and stability.

The simultaneous accurate and uniform adjustment for all the elastic compressing means is obtained by a single nut 9 which is then held fast in its adjusted position;

The automatic and constant control of the normal operation of the torque-limiting arrangement and consequently of the transmission system and of the plant provides an alarm as soon as the parts of the arrangement are in frictional contact, i.e. whenever they are subjected to a relative angular displacement. This cuts out any damage to the parts forming the arrangement as a consequence of a large rise in temperature ascribable to a protracted operation under frictional condition;

When the torque-limiting arrangement has played its part in the case of an overload, it is immediately ready to insure a further service of the kind for which it has been designed, with out its being necessary to readjust or reset it;

The usual excess power of the driving torque at the start is absorbed and its action is automatically cut out since the sturdiness of the arrangement, its accuracy and the automatic control incorporated therewith allow an adjustment which is very near the value for which friction arises between the parts of the arrangement and the transmission is cut out; thus, friction or skidding may arise during the very short time during which the excess power is exerted at the start; the effect of this excess power is speedily damped, whereby a better protection is obtained for the entire plant;

The torque-limiting arrangement requires no upkeep in practice.

Figure 5:
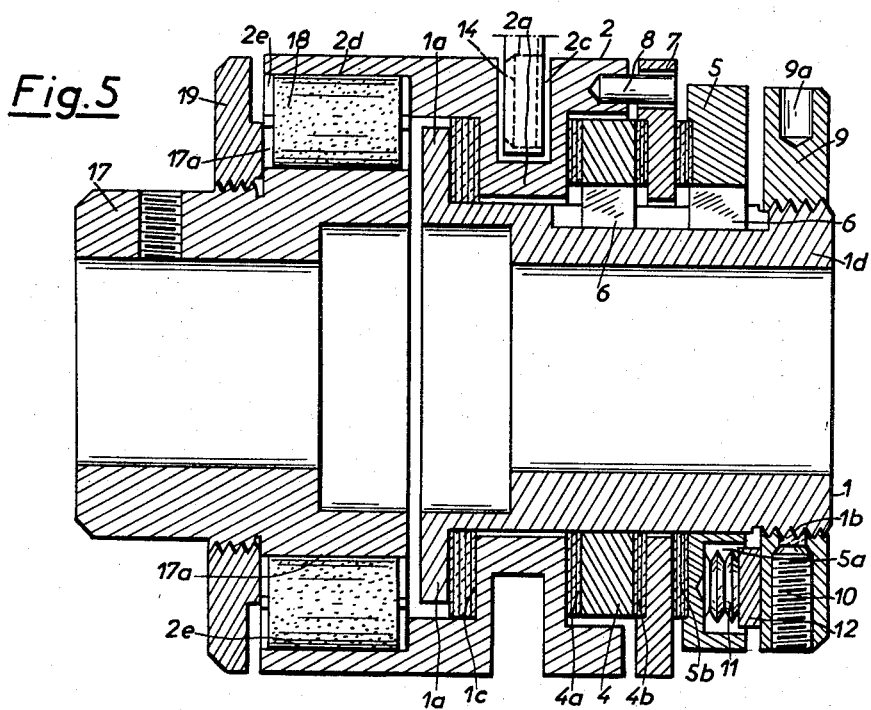
FIG. 5 is a general axial sectional view of an association of the torque-limiting arrangement according to the invention with an elastic coupling.

In the embodiment illustrated in FIG. 5, the frictional torque-limiting arrangement is associated with elastic coupling means which latter are advantageously of the type disclosed in prior French Patent 1,041,727 in the name of Société des Fabrications Unicum.

In the case illustrated in FIG. 5, the sleeve 2 includes an extension 2d coaxially surrounding the coupling section or core 17 adapted to be keyed to the shaft or like driven part.

Furthermore, the sleeve 2d and core 15 are provided with cooperating grooves or depressions 2e and 17a wherein are housed rolls 18 made of rubber or like yielding material showing a suitable resistance, which rolls form as many keying means damping the modifications in torque. Preferably, the radius of the recesses 2e and 17a is larger than the radius of the rolls 18. The latter are held in position by a nut 19 screwed on a threaded bearing surface formed coaxially on the core 17.

The embodiment just described of a combined torque-limiting arrangement with coupling means obviously does not exclude the combination of the torque-limting arrangement with other coupling means.

Figure 6:
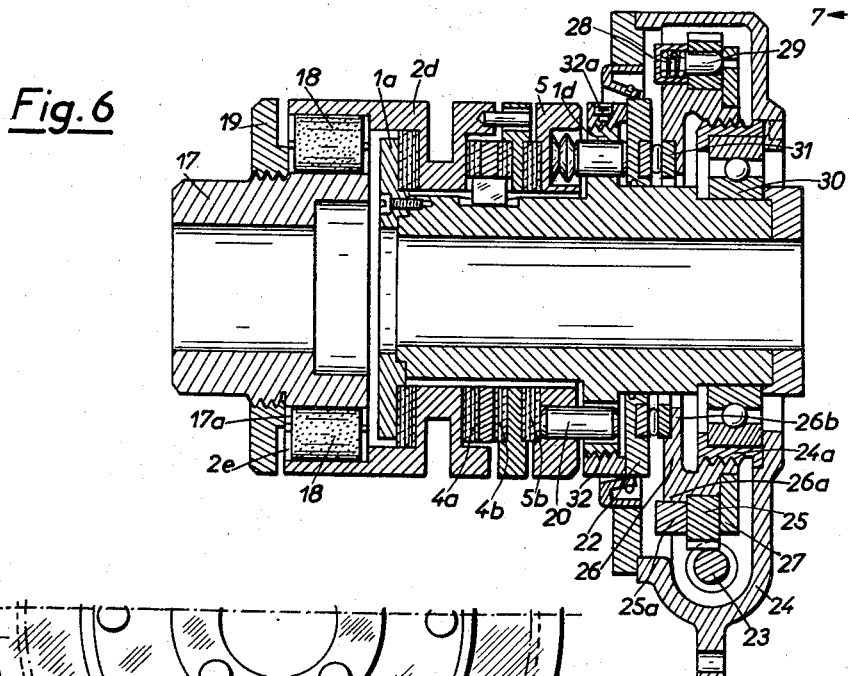
FIG. 6 is a general axial cross-sectional view of a further combination of such a frictional torque-limiting arrangement adapted to operate as a clutch.
Figure 7:
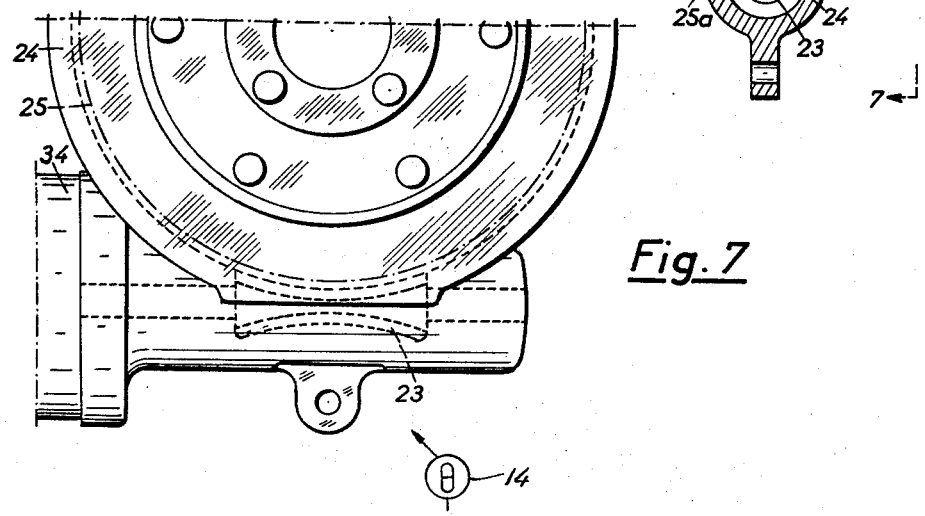
FIG. 7 is a side view of the arrangement according to FIG. 6 as seen in the direction of the arrows 7—7 of FIG. 6.

An application of the invention which is of particular interest including the torque-limiting arrangement disclosed is illustrated in FIGS. 6 and 7.

In said figures is illustrated a clutch system incorporating the parts forming the above-described torque-limiting arrangement said parts carrying the same reference numbers as above and said system includes furthermore the parts of the coupling device illustrated by way of example and showing the above characteristic features.

In said clutch system modifications are provided for the body 1 of which the terminal outer flange 1a forms now an insert whereas the actual body is rigid with an outer shoulder 1d beyond the ring 5 housing the elastic washers 11. The ring 5 is driven in rotation with the body 1 through the agency of the projections or studs 20 constraining it to move in unison with said body, while the possibility of axial movements is retained for said ring.

Other studs 21 engaging the elastic washers 11 are slidingly carried in perforations provided in the shoulder 1d, which studs are subjected to the thrust of a washer 22 freely fitted round the body 1.

The pressure exerted on the washer 22 and consequently on the studs 21 and on the elastic washers 11 and also on the various frictional parts of the torque-limiting arrangement is produced by a control system including a worm 23 adapted to rotate within the bearings of a casing 24. Said worm 23 meshes with a worm wheel 25 fitted on a nut 26, so as to be capable of driving said nut in rotation and also of angularly moving with reference thereto; that is the worm wheel can rotate independently when the nut is locked against rotation.

To this end, the worm wheel 25 is rotatably carried over a shoulder 26a of the nut. A washer 27 rigid with the nut 26 engages laterally the worm wheel 25. The latter is rigid with an annulus 25a housing springs 28 acting in a direction parallel with the axis of the arrangement, on projections 29 adapted to slide in perforations formed in the worm wheel 25. The pressure of said springs 28 is constant and preferably adjustable. The rounded ends of the projections 29 enter partly grooves formed in the washer 27. This constitutes a sort of elastic keying of the worm wheel 25 with reference to the nut 26. The latter is screwed on a threaded projection 24a rigid with the casing 24. The body 1 is adapted to rotate inside said threaded section 24a with the interposition of a roller bearing such as 30. The nut 26 is provided with a radial transverse partition 26b exerting a thrust against the washer 22 through the agency of the needle thrust bearing 31. It will be remarked that a stop 32 is screwed over a threaded section of the shoulder 1d and said stop is held in position after adjustment by a screw 32a. Said stop 32 limits the shifting of the washer 22 towards the shoulder 1d and consequently it limits the compression of the elastic washers 11 to a value which does not prevent the torque-limiting arrangement from playing the part it has to play. A packing 33 prevents the penetration of dust into the casing.

The worm 23 is driven by hand or else, as illustrated in FIG. 7, by a motor 34 which may be started and stopped through manual action or through automatic control means operated in a conventional manner by other mechanisms.

It will be readily understood that upon actuation of the worm 23 in the desired direction, the worm wheel 25 and nut 26 are shifted angularly, whereby the washer 22 and studs 21 are simultaneously urged back to compress the elastic washers 11 until a sufficient pressure arises between the parts forming the torque-limiting arrangement and insures an adherence between the said parts and the driven shaft or the like member. The whole arrangement cooperates thus after the manner of a clutch and then after the manner of a torque-limiting arrangement by reason of the presence of the stop 32 which prevents any exaggerated compression of the elastic washers. When the contact of the washer 22 with the stop 32 is obtained, the worm wheel 25 no longer drives the nut 26 through the agency of the keying system including the spring-controlled studs or projections 29.

When turning the worm in the opposite direction a disconnection is obtained through a reverse operation cutting out the pressure between the parts forming the torque-limiting arrangement.

Obviously and as apparent from the preceding disclosure, the invention is by no means limited to the embodiments and applications which have been disclosed more particularly and it covers instead all the modifications thereof falling within the scope of the accompanying claims.

What I claim is:
1. A frictional torque-transmitting arrangement adapted for being inserted between two force transmitting members comprising a central body including a terminal shoulder and operatively connected with one of said members, a sleeve coaxially surrounding said body and defining an axis, operatively connected with the other member and including an inner flange facing said shoulder, a series of rings fitted around said body in a longitudinally slidable relationship on the side of the flange facing away from the shoulder, means securing alternate rings to the body and to the sleeve to rotate in unison with said body and said sleeve respectively, friction linings inserted between the successive transverse surfaces of the rings, flange and shoulder, a plurality of annularly distributed independent elastic means engaging the ring lying outermost with reference to the flange thereby to urge the other rings towards the flange and the flange towards the shoulder, and pressure exerting means fitted on the body and adapted to exert on the elastic means an adjustable pressure equal for all said elastic means, a groove being provided in a plane perpendicular to said axis through the sleeve and a part of its inner flange to a point registering axially with the rings, said arrangement further comprising a thermostat fitted in said groove and an alarm circuit controlled by said thermostat to close whenever a predetermined temperature is reached by the rings and linings.

2. A frictional torque-transmitting arrangement adapted for being inserted between two force transmitting members comprising a central body including a terminal shoulder and operatively connected with one of said members, a sleeve coaxially surrounding said body and defining an axis, operatively connected with the other member and including an inner flange facing said shoulder, a series of rings fitted around said body in a longitudinally slidable relationship on the side of the flange facing away from the shoulder, means securing alternate rings to the body and to the sleeve to rotate in unison with said body and said sleeve respectively, friction linings inserted between the successive transverse surfaces of the rings, flange and shoulder, a plurality of annularly distributed independent elastic means engaging the ring lying outermost with reference to the flange thereby to urge the other rings towards the flange and the flange towards the shoulder, and pressure exerting means fitted on the body and adapted to exert on the elastic means an adjustable pressure equal for all said elastic means, said arrangement further comprising a coaxial extension of the sleeve, a cylindrical core coaxially housed inside said extension and rigid with the member of the transmission chain connected with the sleeve, said extension and core being provided with cooperating semi-circular recesses and a roll of a mechanically resistant yielding material fitted in each pair of cooperating recesses in the sleeve extension and in the core to couple said sleeve extension and core together.

3. A frictional torque-transmitting arrangement adapted for being inserted between two force transmitting members comprising a central body including a terminal shoulder and operatively connected with one of said members, a sleeve coaxially surrounding said body and defining an axis, operatively connected with the other member and including an inner flange facing said shoulder, a series of rings fitted around said body in a longitudinally slidable relationship on the side of the flange facing away from the shoulder, means securing alternate rings to the body and to the sleeve to rotate in unison with said body and said sleeve respectively, friction linings inserted between the successive transverse surfaces of the rings, flange and shoulder, a plurality of annularly distributed independent elastic means engaging the ring lying outermost with reference to the flange thereby to urge the other rings towards the flange and the flange towards the shoulder, and pressure exerting means fitted on the body and adapted to exert on the elastic means an adjustable pressure equal for all said elastic means, the pressure exerting means being constituted by a nut threadedly and coaxially carried by the body, said arrangement further comprising a clutch including a worm, a worm wheel, coaxial with the body and controlled by the worm, in frictional coaxial relationship with the nut, spring-urged pusher members parallel with the body axis between the nut and the worm wheel to insure the frictional coupling therebetween and a stop adjustably secured to the body and adapted to arrest the rotary movement of the nut when the pressure exerted by it on the elastic means reaches a predetermined value, the rotation of the worm wheel by the being then independent of the nut.

References Cited

UNITED STATES PATENTS

| | | | |
|---|---|---|---|
| 1,132,958 | 3/1915 | Miller | 192—69 |
| 1,988,413 | 1/1935 | Bing. | |
| 2,989,857 | 6/1961 | Helland et al. | |
| 3,335,834 | 8/1967 | Wach | 192—69 |

FOREIGN PATENTS

| | | |
|---|---|---|
| 209,082 | 7/1957 | Australia. |
| 612,880 | 1/1961 | Canada. |
| 1,062,939 | 4/1954 | France. |

BENJAMIN W. WYCHE III, *Primary Examiner.*

U.S. Cl. X.R.

64—27, 30; 192—55, 94